US007003422B2

(12) United States Patent
Bauer et al.

(10) Patent No.: US 7,003,422 B2
(45) Date of Patent: Feb. 21, 2006

(54) METHOD FOR CONNECTING TEST BENCH ELEMENTS AND SHELL DEVICE

(75) Inventors: Matthias Bauer, Otterfing (DE); Wolfgang Ecker, Munich (DE); Renate Henftling, Furstenfeldbruck (DE); Martin Zambaldi, Munich (DE); Andreas Zinn, Munich (DE)

(73) Assignee: Infineon Technologies AG, Munich (DE)

( * ) Notice: Subject to any disclaimer, the term of this patent is extended or adjusted under 35 U.S.C. 154(b) by 4 days.

(21) Appl. No.: 10/313,691

(22) Filed: Dec. 4, 2002

(65) Prior Publication Data

US 2003/0139892 A1 Jul. 24, 2003

(30) Foreign Application Priority Data

Dec. 14, 2001 (DE) ................. 101 61 578

(51) Int. Cl.
*G01R 27/28* (2006.01)
*G01R 31/00* (2006.01)
*G01R 31/14* (2006.01)
*G06F 19/00* (2006.01)

(52) U.S. Cl. .................................... 702/120
(58) Field of Classification Search ............... 702/120, 702/122; 395/500, 704, 708, 578; 703/14; 364/578, 513
See application file for complete search history.

(56) References Cited

U.S. PATENT DOCUMENTS 5,923,867 A * 7/1999 Hand ........................ 703/14
2003/0028343 A1 * 2/2003 Velichko et al. ............ 702/122

FOREIGN PATENT DOCUMENTS

WO WO 01/37089 5/2001

* cited by examiner

*Primary Examiner*—Bryan Bui
*Assistant Examiner*—Aditya S. Bhat
(74) *Attorney, Agent, or Firm*—Jenkins, Wilson & Taylor, P.A.

(57) ABSTRACT

The invention provides a method for connecting test bench elements (102a–102f), and a shell device, a test bench element shell (201) partially or completely surrounding a circuit unit (101) to be verified, so that test bench elements (102a–102f) can be connected to the test bench element shell (201). Test data streams (203a–203f) pass in each case between the test bench elements (102a–102f) and the test bench element shell (201), the test bench element shell (201) which surrounds the circuit unit (101) to be verified being connected via interface data streams (P0(0)–P0(7), P1(0)–P1(7), 204a, 204b, 204c) to the circuit unit (101) to be verified. The test bench element shell (201) ensures that in each case a specific protocol with associated operations can be executed, during which process, depending on the configuration, an interface exchanges interface data streams (P0(0)–P0(7), P1(0)–P1(7), 204a–204c) of the circuit unit (101) to be verified with the corresponding test bench element (102a–102f).

20 Claims, 6 Drawing Sheets

METHOD FOR CONNECTING TEST BENCH ELEMENTS AND SHELL DEVICE

TECHNICAL FIELD

The present invention relates to a method for carrying out tests and simulations in order to check the functional correctness of a circuit unit, and relates in particular to a method for connecting test bench elements and to a shell device for carrying out the method.

BACKGROUND ART

Test benches are, for example, models which simulate the environment of a circuit design and corresponding input signals, and check output signals, for example signal responses, which are dependent on these input signals.

Such models are implemented, for example, but not exclusively, in hardware description languages such as VERILOG and VHDL. In many cases, it is possible to carry out a co-simulation of hardware units and software units, such as is described, for example, in "Matthias Bauer, Wolfgang Ecker: Hardware/Software co-Simulation in a VHDL-based Test Bench Approach, DAC 97, Anaheim, Calif., U.S.A.".

In a test bench, for example, a model of a circuit arrangement or of a circuit design is simulated, it being necessary in many cases to take into account not only a functionality of the circuit design but also a timing characteristic.

Test benches according to the prior art are, for example, constructed in such a way that one or more test bench elements are provided as logic interfaces between a test bench controller and a circuit unit to be verified. A test bench element may be embodied, for example, as a transactor or as a protocol generator, the respective test bench element generating the signal value profiles which are required for a logic interface. A logic operation carried out on the signals and a definition of the respective signal value profiles correspond to a protocol, specific sequences of signal value profiles being combined to form protocol operations, for example the operations:

"read memory";

"send ATM (asynchronous transfer mode) cell";

etc.

and such protocol operations can in turn be interleaved with one another in order to carry out, for example, the following operations:

"carry out DMA transmission";

"send ATM cell sequence" in order to reprogram ATM switch, etc.

Such protocol-operation-related description facilitates a configuration of test bench elements which can be in turn repeatedly re-used when tests are carried out.

If a plurality of protocol-generating units share one interface which can then itself only be used alternately, or if a programmable protocol generator which can generate different protocols is located on the circuit unit to be verified, it is disadvantageously impossible to directly use or connect a test bench element which generates only one protocol.

In order to be able to connect through specific interfaces and/or specific interface signals or interface data streams to corresponding test bench elements, different types of interfaces or interface signals must be taken into account, for example:

serial interfaces, parallel interfaces, and individual bits or groups of bits which are to be set and/or to be read.

The circuit unit to be verified can be formed by any desired circuit unit, for example a microprocessor, a microchip graphics card, etc., digital signals, if appropriate however also analog and digital signals, being predominantly processed.

Test bench elements are appropriately configured in such a way that they can be used with the largest possible number of circuit units to be verified, under the largest possible number of test and simulation conditions. A test bench controller is conventionally used as a central control element which makes it possible to control the entire course of a test and/or of a simulation. A test or simulation program which is provided in a centralized or decentralized fashion is conventionally applied to the test bench controller.

Furthermore, the test bench controller communicates with each individual test bench element by means of a control data stream, a connection being provided between the test bench controller and the respective test bench element. A sequence of protocol operations may be specified, for example, in a test bench element, said operations being either permanently coded in a model or a desired sequence of protocol operations being read from a file.

In some cases, the test bench elements can be synchronized with one another. Here, when intersecting tests are simulated, during which all the protocol operations of all the test bench elements are to be carried out, protocol operations which occur simultaneously at different points, i.e. in a respective test bench element, must be specified.

Conventional test and simulation methods therefore predominantly use test bench architectures which are controlled by a test bench controller as the central unit, individual test bench elements being informed as to which protocol operations are to be carried out. Furthermore, it is necessary to ensure that the test bench elements can inform the test bench controller about the degree of success and the data with which a sequence of the specific protocol operations was carried out or terminated.

Figure 4:
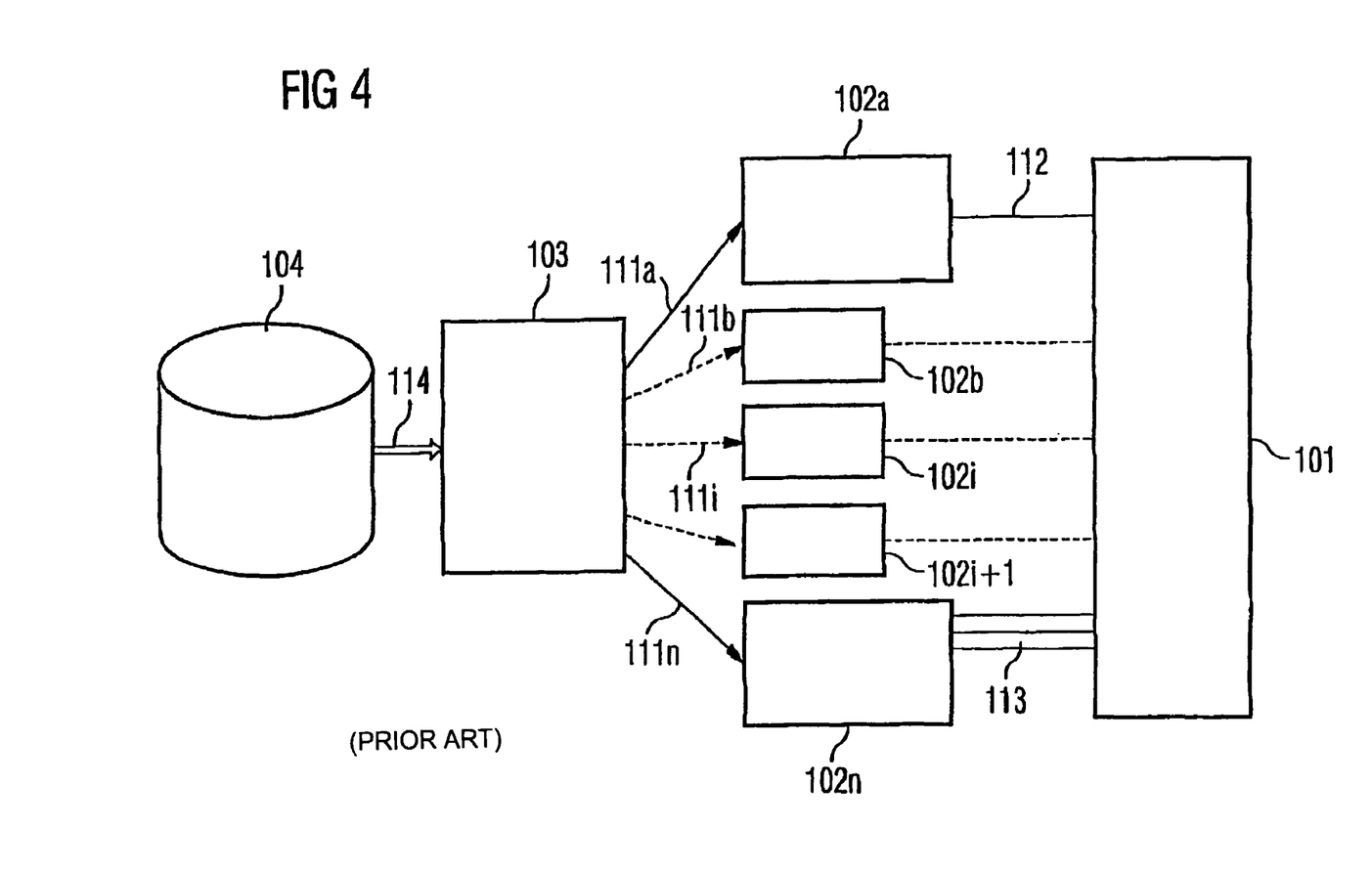
FIG. 4 shows a conventional method for connecting test bench elements to a circuit unit to be verified.

FIG. 4 shows a conventional method for simulating and testing a circuit unit 101 to be verified, by means of a simulation program stored in a control element 104. As is shown in FIG. 4, the control element 104 which contains a specific simulation program is connected to the test bench controller 103, a controller data stream 114 being transferred to the test bench controller 103 by the control element 104.

Test bench elements 102a–102n are conventionally connected by means of control data streams 111a–111n.

It is to be noted that one or more test bench elements 102a, . . . 102i, . . . 102n may be present, i representing an index.

For example, FIG. 4 illustrates five different test bench elements, the test bench element 102a corresponding, for example, to a serial interface which exchanges data with the circuit unit 101 to be verified, by means of a serial test data stream 112. As a further example, the test bench 102n is illustrated as a parallel interface which exchanges test data with the circuit unit 101 to be verified, by means of a parallel test data stream 113.

In the same way, data is exchanged between the other test bench elements and the circuit unit 101 to be verified, specified data streams (not shown) being exchanged. For example, FIG. 4 illustrates five test bench elements 102a, 102b, 102i, 102i+1 and 102n, but it is possible to provide fewer or more test bench elements. It is clearly apparent that the number of control data streams 111*a*, . . . 111*i*, (i=index), . . . 111*n* must correspond to the number of test bench elements 102*a*–102*n*.

This conventional connection of test bench elements 102*a*–102*n* to a central test bench controller 103 as central control element has a series of disadvantages.

A main disadvantage of a conventional method for connecting test bench elements 102*a*–102*n* to the test bench controller 103 is that a test bench element that generates only one protocol cannot be used or connected directly if a plurality of protocol-generating units share one interface which then itself can only be used alternately, or if a programmable protocol generator, which can generate different protocols, is present on the circuit unit to be verified.

A conventional stimulus generation is carried out at a bit level and not at a protocol level, which permits different protocols to be created but has the disadvantage that a transaction-based description of the interface protocols cannot be provided.

A further disadvantage of conventional methods for connecting test bench elements is that an effective support of a connection of test bench elements which is directed at re-use cannot be provided.

Yet a further disadvantage of conventional methods for connecting test bench elements is that a separate environment has to be generated for each configuration of an interface as a separate test and simulation device is necessary for each possible embodiment of an interface, precisely one embodiment of the interface having to be functionally checked in each of these test/simulation devices by connecting a corresponding test bench element directly to the circuit element to be verified.

In addition, in methods for connecting test bench elements according to the prior art, it is disadvantageously necessary to check each configuration of an interface by means of a specific simulation, which constitutes extremely disadvantageous properties in particular when hardware accelerators are used and when there is a simulation of interfaces and/or of interface signals or interface data streams which can change their specific configuration or their profile, for example by means of dynamically switchable pins, during operation.

Furthermore, different test bench elements may communicate simultaneously with the circuit element to be verified, i.e. in the same time interval, although this is not provided for in the test sequence and/or simulation sequence. Here, there is a problem that a functionally perfectly correctly functioning and functionally capable circuit element can exhibit faulty behavior which can advantageously only be interpreted with difficulty, and can therefore usually only be eliminated with a large degree of effort.

Furthermore, information which is present inter alia in the data streams to be transmitted can disadvantageously be lost as a result of this multiple communication between different test bench elements and the circuit unit to be verified. Here, it is, under certain circumstances, possible in an inexpedient way for the circuit to carry on operating without faults or without issuing a fault message although it ought to terminate the execution or ought to issue a message.

Furthermore, it is inexpedient for the circuit logic to go into undefined, unreproducible states. A disadvantage is especially that these states can no longer be eliminated in many cases.

Furthermore, with conventional methods it is problematic that different test bench elements access one interface. Here, it is disadvantageously possible for driver conflicts to occur if a test bench element inadmissibly attempts to access the circuit unit to be verified.

SUMMARY OF THE INVENTION

It is thus an object of the present invention to provide a method for connecting test bench elements which permits a plurality of protocol-generating units to divide one interface, different types of interfaces being taken into account, and a supervisory operation of a state being provided; and/or a control operation of at least one test bench element being provided; and/or a means of monitoring, controlling and/or supervising a communication of at least one test bench element with the circuit unit to be verified being provided; and/or a means of modifying, diverting, assigning, controlling and/or monitoring a connection structure of interface signals or buses and/or input/output signals or buses by means of test bench element shells being provided.

This object is achieved by means of a method for connecting test bench elements as claimed in claim 1 and a shell device having the features of claim 41.

Further refinements of the invention emerge from the subclaims.

The core of the invention is a method for connecting test bench elements, a circuit unit to be verified being introduced into a test/simulation device, being connected to at least one test bench element shell in order to transfer interface data streams, the at least one test bench element shell being connected to test bench elements in order to transfer test data streams so that a through-connection of interface data streams to corresponding test bench elements is made possible.

An essential idea of the invention also consists in the fact that a control operation and/or a monitoring operation of states and modes of operation of test bench elements is provided by means of at least one test bench element supervisory shell, a means of monitoring, controlling and/or supervising a communication of at least one test bench element with the circuit unit to be verified also being provided, and a [sic] and/or a means for modifying, diverting, assigning, controlling and/or monitoring a connection structure of interface signals or buses and/or input/output signals or buses by means of the at least one test bench element connection shell being provided.

The method according to the invention for connecting test bench elements as claimed in claim 1 and the shell device having the features of claim 31 have the following advantages.

An essential advantage of the method according to the invention for connecting test bench elements is that a test bench element which generates only one protocol can be connected even if a plurality of protocol-generating units share one interface.

It is advantageously possible for a test bench element which generates only one protocol to be connected even if a programmable protocol generator with which different protocols can be generated is located on the circuit unit to be verified.

A further advantage of the method according to the invention for connecting test bench elements is that interfaces of a circuit unit to be verified can be configured on the basis of signal values at specific connection elements of the circuit unit to be verified, a specific signal value deciding, for example, whether an interface is operated in an X mode or a Y mode.

The method according to the invention for connecting test bench elements can advantageously monitor a correct method of operation of test bench elements and a communication of test bench elements.

In addition, an advantage of the method according to the invention is that a connection structure of interface signals or buses and/or input/output signals or buses can be modified in a predefinable way during a simulation or during a test of the circuit unit to be verified. Here, in particular interface signals or buses and/or input/output signals or buses can be connected, diverted or assigned to one another on a temporary or even long-term basis.

The method according to the invention for simulating and for testing a circuit unit to be verified in which interfaces of the circuit unit to be verified can be connected to different test bench elements of a test/simulation device have essentially the following steps:

a) the circuit unit to be verified is connected to at least one test bench element shell of the test/simulation device in order to transfer and switch interface data streams which are correspondingly output to the associated test bench elements by the circuit unit to be verified;

b) the at least one test bench element shell is connected to the test bench elements in order to transfer test data streams which are output by the test bench elements to the circuit unit to be verified;

c) at least one test bench element shell is controlled by means of a shell control data stream which is provided by a test bench controller; and d) the interface data streams are evaluated by a test bench element shell which is connected to the test bench elements, in order to check the operational capability of the circuit unit to be verified.

In the subclaims there are advantageous developments and improvements of the respective subject matter of the invention.

According to one preferred development of the present invention, a test bench element shell is placed completely around a circuit unit to be verified in order to provide a through-connection of interface data streams to corresponding test bench elements.

According to a further preferred development of the method according to the invention, a test bench element shell is partially placed around a circuit unit to be verified in order to provide a partial through-connection of interface data streams to corresponding test bench elements.

According to yet a further preferred development of the present invention, a test bench element shell is divided into at least two test bench element shell components so that interface data streams can be applied to different embodiments of test bench elements.

According to yet a further preferred development of the present invention, the at least one test bench element shell or the at least one test bench element shell component is provided as a test bench element supervisory shell for supervising, monitoring and analyzing data streams between test bench elements and the circuit unit to be verified.

According to yet a further preferred development of the present invention, the at least one test bench element shell or the at least one test bench element shell component is provided as a test bench element connection shell for modifying, diverting, assigning, controlling and/or monitoring a connection structure.

According to yet a further preferred development of the present invention, a configuration which connects interface data streams of the circuit unit to be verified to a corresponding test bench element is provided in a test bench element shell component.

According to yet a further preferred development of the present invention, connections of test bench elements to the circuit unit to be verified are formed at the start of or during a simulation and/or a test and then remain fixed.

According to yet a further preferred development of the present invention, connections of test bench elements to the circuit unit to be verified are modified during a simulation/test.

According to yet a further preferred development of the present invention, a test bench element shell and/or a test bench element shell component and/or a test bench element supervisory shell and/or a test bench element connection shell are configured by means of a central test bench controller.

According to yet a further preferred development of the present invention, a test bench element shell and/or a test bench element component shell and/or a test bench element supervisory shell and/or a test bench element connection shell are configured independently by means of table/data structures or files.

According to yet a further preferred development of the present invention, a capacity to re-use and structure test benches using test bench element shells is increased by virtue of the fact that test bench elements are not structurally connected to a test bench element shell or at least two test bench element shells at the highest level but rather are also connected in a separate subunit, at least one test bench element being integrated into a test bench element shell or a test bench element shell component.

According to yet a further preferred development of the present invention, interfaces of a circuit unit to be verified are configured by means of signal values at specific connection elements of the circuit unit to be verified, in which case, for example, a specific signal value and a connection element of the circuit unit to be verified deciding, during a reset phase, whether an interface is operated in an X mode or a Y mode.

According to yet a further preferred development of the present invention, the test bench element shell and/or the at least one test bench element shell component are provided in order to set and/or analyze signal values which are provided in order to configure interfaces of the circuit unit to be verified.

According to yet a further preferred development of the present invention, a plurality of signals or all the signals which pass through a test bench element shell and/or at least one test bench element shell component are logged, storage being provided in a file, a data structure and/or a table.

According to yet a further preferred development of the present invention, the test bench element shell and/or the at least one test bench element shell component are formed as a data multiplexer in order to demultiplex multiplexed signals.

According to yet a further preferred development of the present invention, the test bench element shell and/or the at least one test bench element shell component are actuated by a test bench controller.

According to yet a further preferred development of the present invention, the test bench element shell and/or the at least one test bench element shell component are actuated by means of at least one test bench element.

According to yet another preferred development of the present invention, a structural composition of log-generating test bench elements is provided, an instantiation of test bench elements being made possible at a lower level within a test bench element shell.

According to yet a further preferred development of the present invention, configuration signals are applied to the circuit unit to be verified in order to configure connection elements.

According to yet a further preferred development of the present invention, configuration signals are applied to the circuit unit to be verified in order to configure the at least one test bench element shell or the at least one test bench element shell component or the test bench element supervisory shell or the test bench element connection shell.

According to yet a further preferred development of the present invention, configuration signals are applied to the at least one test bench element shell or test bench element shell component or test bench element supervisory shell or test bench element connection shell in order to configure it in a predefinable fashion.

According to yet a further preferred development of the present invention, a shell device is provided in order to generate transaction-based vectors in a way which is compatible with fabrication tests.

According to yet a further preferred development of the present invention, a shell device is provided with which individual bits or groups of bits are set, reset or read.

According to yet a further preferred development of the present invention, a shell device is provided with which not only structural hierarchies but advantageously also logical hierarchies such as for example a class hierarchy, a call hierarchy, etc. are provided.

According to yet a further preferred development of the present invention, a shell device is provided in the form of at least one test bench element supervisory shell which can both create or write and evaluate or analyze data streams.

According to yet a further preferred development of the present invention, a shell device or at least one test bench element supervisory shell is provided which either permits test bench elements both to create or write and evaluate or analyze data streams, or rules out the latter in a predefinable fashion.

According to yet a further preferred development of the present invention, an analysis and/or an evaluation of data streams within the at least one test bench element supervisory shell is provided by means of evaluation units which are constructed on an interface-specific basis. These evaluation units can therefore be advantageously implemented in a variable fashion, and thus re-used, for a corresponding interface in any desired different test bench supervisory shells.

According to yet a further preferred development of the present invention, a control operation of at least one test bench element supervisory shell is provided in such a way that a simultaneous access by test data streams of different test bench elements to a single interface data stream is prevented.

According to yet a further preferred development of the present invention, a control operation of at least one test bench element supervisory shell is provided in such a way that a simultaneous access by test data streams of different test bench elements to one interface data stream in each case is prevented.

According to yet a further preferred development of the present invention, a control operation of at least one test bench element supervisory shell is provided in such a way that a simultaneous access of test data streams of any desired number of test bench elements to any desired number of interface streams is prevented.

According to yet a further preferred development of the present invention, a control operation of at least one test bench element supervisory shell is provided in such a way that a simultaneous transmission of instruction sequences of different test bench elements is prevented.

According to yet a further preferred development of the present invention, a control operation of at least one test bench element supervisory shell is provided in such a way that in each case a time window is assigned to the at least one test bench element.

According to yet a further preferred development of the present invention, a control operation of at least one test bench element supervisory shell is provided by analyzing or by detecting transmitted data streams in the test bench element supervisory shell itself.

According to yet a further preferred development of the present invention, a control operation of at least one test bench element supervisory shell by means of a shell control data stream and/or by analyzing or by detecting transmitted data streams prevent the transmission of specific instruction sequences and/or data sequences by the at least one test bench element to the circuit unit to be verified.

According to yet a further preferred development of the present invention, a monitoring operation of test data streams, transmitted via the at least one test bench element supervisory shell, by means of a shell control data stream and/or by analyzing or by detecting transmitted data streams is provided in such a way that a warning message is issued when there is an unauthorized transmission by the at least one test bench element.

According to yet a further preferred development of the present invention, a monitoring process of test data streams, transmitted via the at least one test bench element supervisory shell, by means of a shell control data stream and/or by analyzing or by detecting transmitted data streams is provided in such a way that a prioritization of, for example, both the accessing test bench elements and the data sequences and/or instruction sequences to be transmitted or the data streams and/or instruction streams is carried out.

According to yet a further preferred development of the present invention, a control operation and/or a monitoring operation of test data streams, transmitted via the at least one test bench element supervisory shell, by means of a shell control data stream and/or by analyzing or by detecting transmitted data streams is provided for any desired predefinable number of test bench elements connected to the at least one test bench element supervisory shell.

The shell device according to the invention for connecting test bench elements also has:

a) a circuit unit to be verified in a test/simulation device;
b) at least one test bench element; and
c) at least one test bench element shell for connecting the circuit unit to be verified to the at least one test bench element in order to transfer and switch interface data streams and test data streams.

BRIEF DESCRIPTION OF THE DRAWINGS

Exemplary embodiments of the invention are illustrated in the drawings and explained in more detail in the following description.

In the drawings.

DETAILED DESCRIPTION OF THE INVENTION

Figure 1:
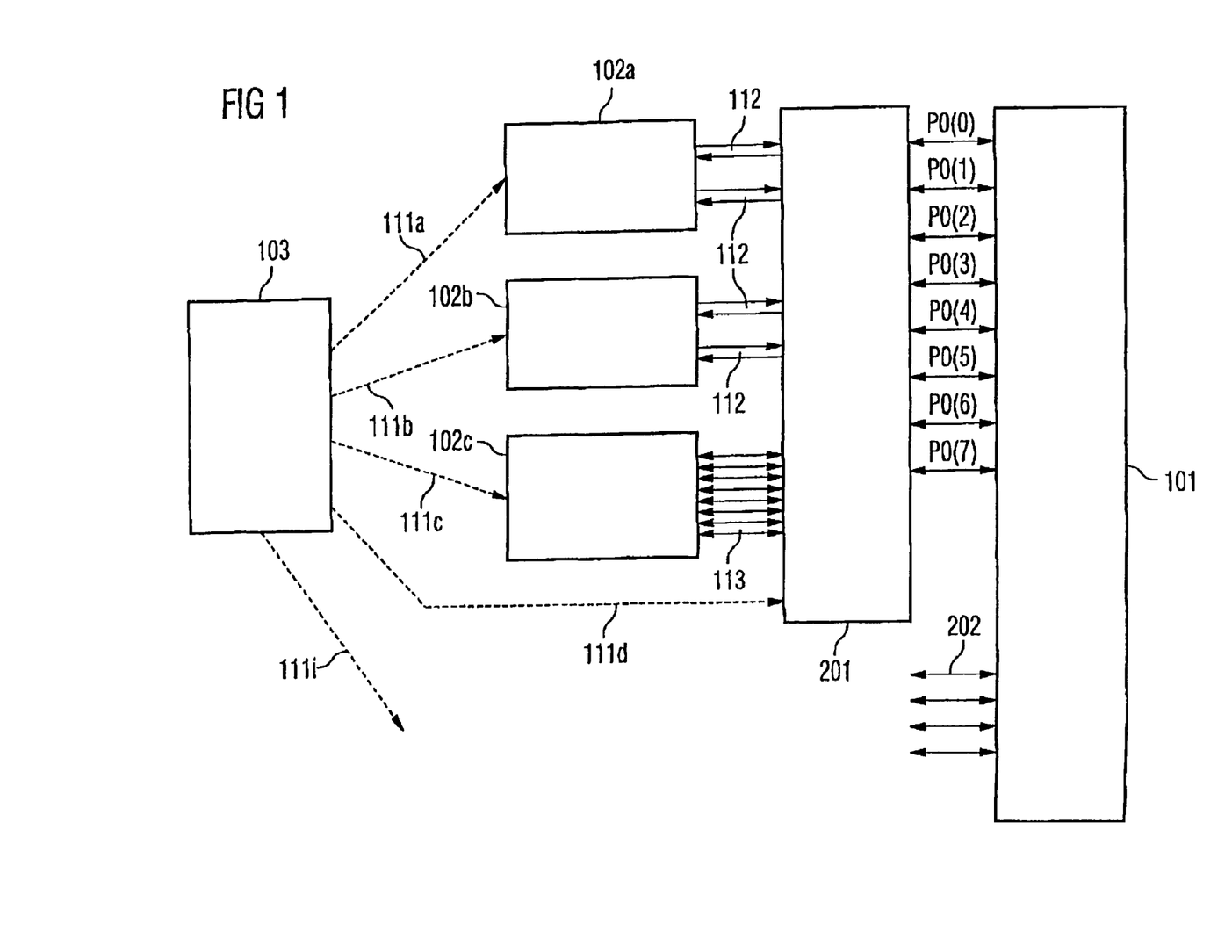
FIG. 1 shows a test bench element shell, arranged between a circuit unit to be verified and corresponding test bench elements, according to a preferred embodiment of the present invention.

FIG. 1 shows a test bench element shell, arranged between a circuit unit to be verified and corresponding test bench elements, in accordance with an embodiment of the present invention.

In the arrangement shown in FIG. 1, three test bench elements 102a, 102b and 102c are shown by way of example, the test bench elements 102a and 102b having serial interfaces in order to exchange serial test data streams 112 via a test bench element shell 201 with the circuit unit 101 to be verified, and the test bench element 102c being provided with a parallel interface in order to exchange a parallel test data stream 113 via the test bench element shell 201 with the circuit unit 101 to be verified.

However, it is to be noted that more than three or less than three test bench elements can be connected to the test bench element shell 201. In the exemplary embodiment shown in FIG. 1, the test bench element shell 201 is in turn connected via interface data streams P0(0)–P0(7) to a circuit unit 101 to be verified, a total of eight lines for exchanging data streams between interfaces being provided here. Further interface data streams 202 can in principle be exchanged with the circuit unit 101 to be verified. Each individual test bench element 102a–102c contains specific control data streams 111a–111c from a test bench controller 103.

Furthermore, as indicated by a dashed line 111d, a control data stream is routed directly from the test bench controller 103 to the test bench element shell 201 in order to permit specific configurations of interfaces to be defined. Further control data streams, as indicated by a dashed arrow 111i (i=index), show that more than three test bench elements 102a–102c can be actuated by the test bench controller 103. For the sake of clarity and in order to avoid an overlapping description, the test bench controller 103 and connections between the test bench controller 103 and corresponding test bench elements 102a–102g are omitted in the following FIGS. 2 and 3, only control data streams 111a–111g being indicated in the form of double arrows in FIGS. 2 and 3.

The test bench element shell 201 shown in FIG. 1 will be explained below in more detail with reference to FIGS. 2 and 3.

Figure 2:
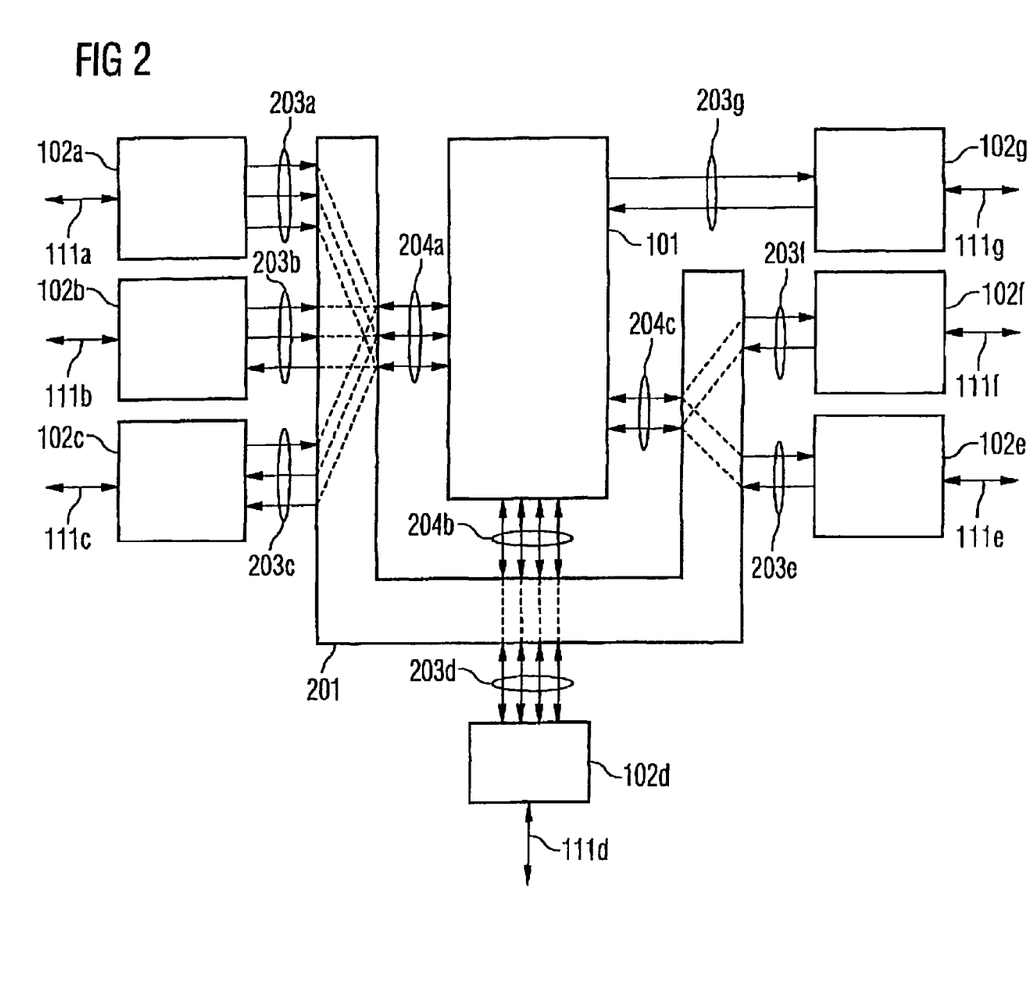
FIG. 2 shows a test bench element shell which partially surrounds a circuit unit to be verified, according to a further preferred embodiment of the present invention.

FIG. 2 shows a test bench element shell which partially surrounds a circuit unit to be verified, according to an embodiment of the present invention.

In the arrangement shown in FIG. 2, a test bench element shell 201 almost completely surrounds a circuit unit 101 to be verified so that the test bench elements 102a–102f can be connected to the test bench element shell 201. Only a seventh test bench element 102g is directly connected via a test data stream 203g to the circuit unit 101 to be verified.

It is to be noted that in the exemplary embodiment shown in FIG. 2 six test bench elements 102a–102f are connected directly to the test bench element shell 201, while one test bench element 102g is connected directly to the circuit unit 101 to be verified, but that a different number from the number of test bench elements shown in FIG. 2 can be connected directly to the circuit unit 101 to be verified or the test bench element shell 201. Test data steams 203a–203f each pass between the test bench elements 102a–102f and the test bench element shell 201. A test data stream 203g passes between a test bench element 102g and the circuit unit 101 to be verified.

While the test bench element 102g is connected according to the prior art shown in FIG. 4, the test bench elements 102a–102f in FIG. 2 are connected via the test bench element shell 201 according to an exemplary embodiment of the present invention. The test bench element shell 201 which surrounds a circuit unit 101 to be verified is in turn connected via interface data streams 204a, 204b and 204c to the circuit unit 101 to be verified. In the exemplary embodiment of the method according to the invention for connecting test bench elements, which is shown in FIG. 2, the test bench element shell 201 then ensures that in each case a specific protocol can be executed with associated operations, in which case, depending on the configuration, an interface connects interface data streams of the circuit unit to be verified to the corresponding test bench element. Connections of test bench elements to the circuit unit 101 to be verified can be established at the start of a simulation or of a test and then remain fixed, but they can also be modified during a simulation or a test.

A test bench element shell 201 can thus be configured by means of a central test bench controller 103 or in a decentralized way by means of further test bench elements 102a–102g or completely independently by means of externally predefinable tables, data structures or files.

Figure 3:
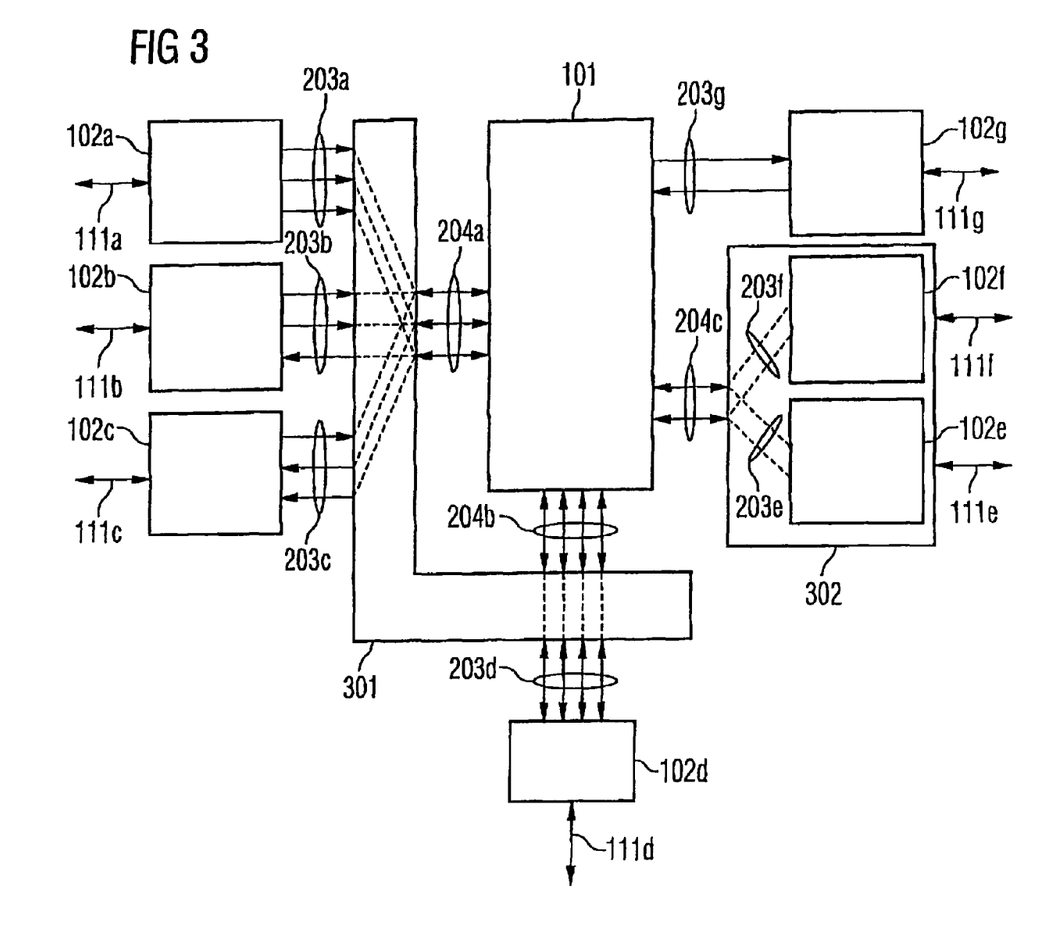
FIG. 3 shows a test bench element shell, divided into a first test bench element shell component and a second test bench element shell component, according to a further exemplary embodiment of the present invention.

FIG. 3 illustrates a test bench element shell, divided into a first test bench element shell component 301 and a second test bench element shell component 302, in accordance with a further exemplary embodiment of the present invention.

The exemplary embodiment of the present invention shown in FIG. 3 has a modified test bench element shell, the test bench element shell being split into a first test bench element shell component 301 and a second test bench element shell component 302. It is to be noted that the test bench element shell can also be split into more than two test bench element shell components. As shown in FIG. 3, the four test bench elements 102a–102d are connected via the first test bench element shell component 301 to the circuit unit 101 to be verified, while the test bench elements 102e and 102f are integrated into the second test bench element shell component 302. The seventh test bench element 102g is, as shown in FIG. 2, conventionally connected by means of a test data stream 203g directly to the circuit unit 101 to be verified.

The other connections shown in FIG. 3 correspond to the connections shown in FIG. 2, which are not described here again in order to avoid an overlapping description.

In the arrangement shown in FIG. 3, the test bench elements 102e and 102f are not connected structurally at the highest level but rather connected structurally in a separate test bench element shell component 302 in order to improve a capacity to re-use and structure test benches with the test bench element shell concept. The test bench elements 102e and 102f in the exemplary embodiment of the present invention can thus be instantiated in a separate test bench element shell component 302 at a low level.

Figure 5:
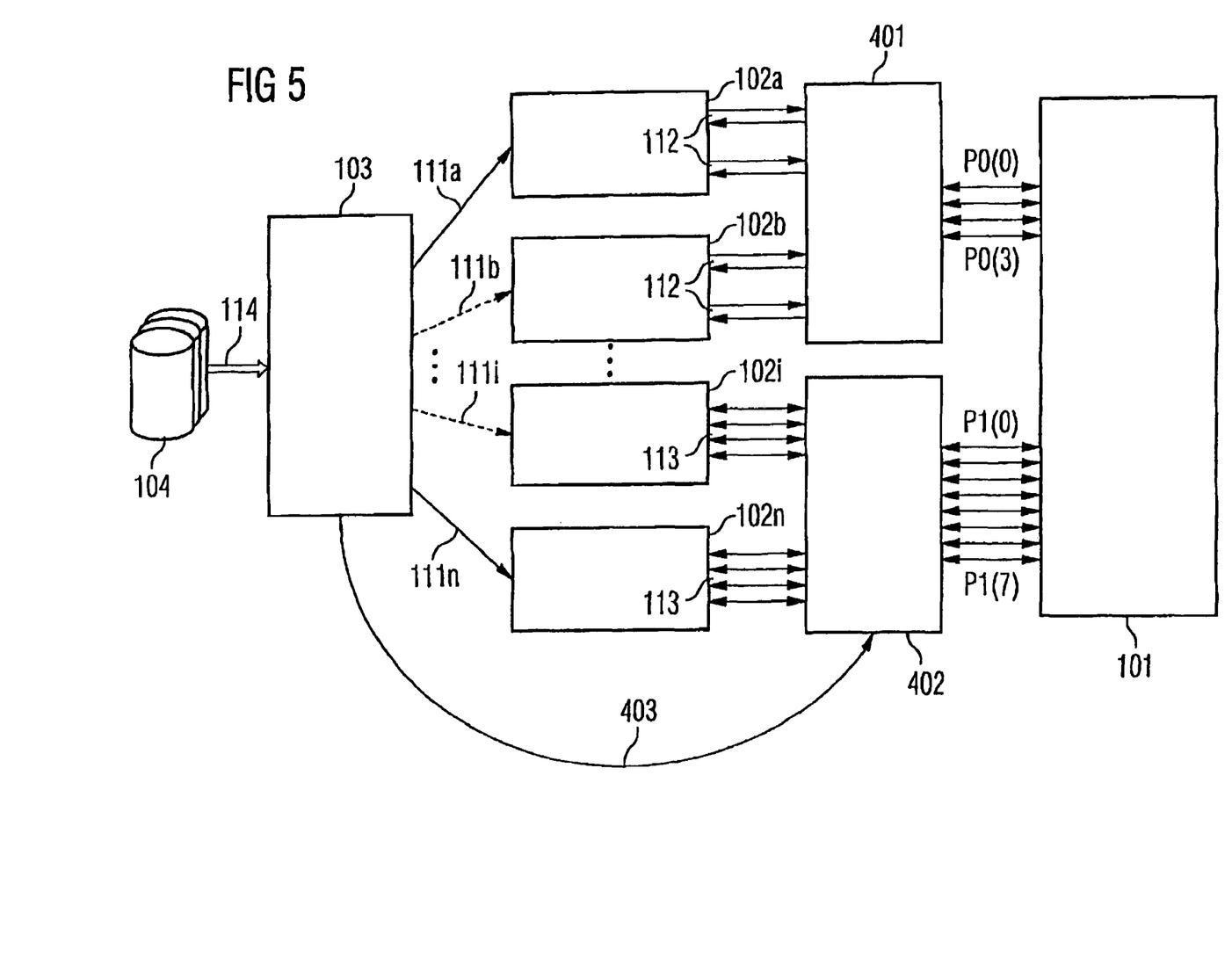
FIG. 5 shows two test bench element supervisory shells, arranged between the circuit unit to be verified and corresponding test bench elements, according to a further preferred embodiment of the present invention.

FIG. 5 shows two test bench element supervisory shells, i.e. a first test bench element supervisory shell 401 and a second test bench element supervisory shell 402, which are arranged between the circuit unit 101 to be verified and corresponding test bench elements 102a–102n.

The block diagram shown in FIG. 5 illustrates an arrangement according to a preferred exemplary embodiment of the present invention. The circuit unit 101 to be verified is connected via first interface data streams P0(0)–P0(3) to the first test bench element supervisory shell 401 which exchanges serial test data streams 112 with the test bench elements 102a, 102b, and via second interface data streams P1(0)–P1(7) to a second test bench element supervisory shell 402 which exchanges parallel test data streams 113 to the test bench elements 102i and 102n.

It is to be noted that in principle more than two test bench elements supervisory shells 401, 402 can be connected. According to the exemplary embodiment of the present invention in FIG. 5, the test bench element supervisory shells 401 and 402 have specific features which permit signals to be supervised or monitored and controlled unidirectionally and bidirectionally.

Furthermore, FIG. 5 illustrates that the second test bench supervisory shell 402 receives a shell control data stream 403 from the test bench controller 103, while the first test bench supervisory shell 401 responds to transferred signal profiles or data streams independently of the test bench controller 103.

Supervision or monitoring or controlling of a state of test bench elements 102a–102n or of modes of operation of the test bench elements 102a–102n then leads according to the invention to different consequences.

Firstly, the test bench element supervisory shell 401 issues a warning message or a fault message if a plurality of different test bench elements 102a–102n simultaneously access one interface in each case and/or a single interface in total or if specific, unauthorized successions of signal sequences or instruction sequences occur.

Secondly, at least one test bench element supervisory shell 401 or 402 can carry out a predefinable prioritization which permits the corresponding interface to be accessed by the test bench elements 102a–102n in a predefinable sequence, or permits a conflict to be avoided when there is simultaneous access.

Finally, the test bench element supervisory shells 401, 402 can block one or more instruction sequences in the transmitted data streams so that only authorized instruction sequences can be transmitted.

Figure 6:
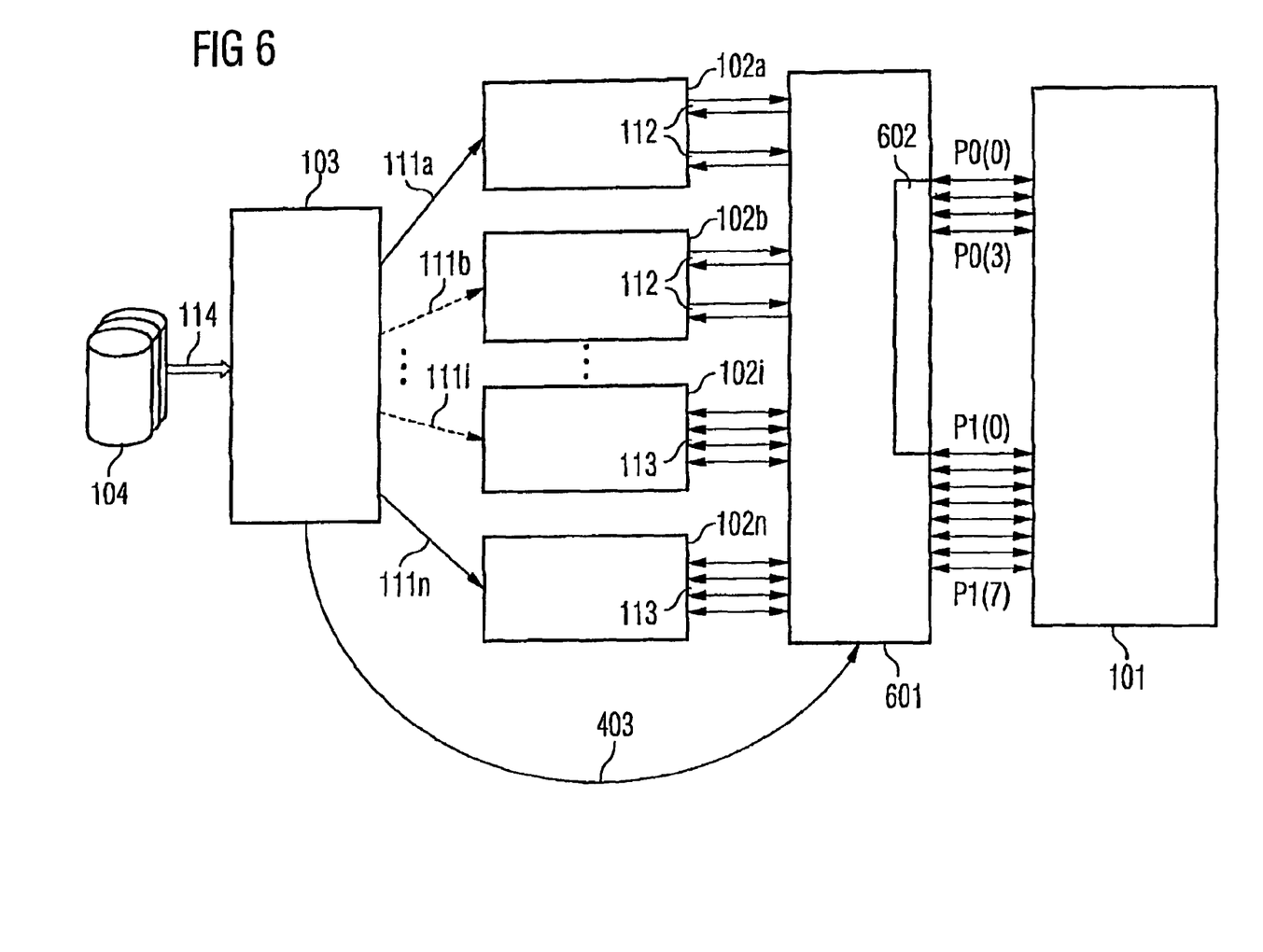
FIG. 6 shows a test bench element connection shell, arranged between the circuit unit to be verified and corresponding test bench elements, according to a further preferred embodiment of the present invention.

FIG. 6 illustrates a test bench element connection shell 601, arranged between the circuit unit 101 to be verified and corresponding test bench elements 102a–102n, according to a further preferred embodiment of the present invention.

The circuit unit 101 to be verified is connected via first interface data streams P0(0)–P0(3) and via second interface data streams Pl(0)–Pl(7) to the test bench element connection shell 601, serial test data streams 112 being exchanged with the test bench elements 102a, 102b in this example, and parallel test data streams 113 being exchanged with the test bench elements 102i and 102n.

Furthermore, FIG. 6 illustrates that the test bench element connection shell 601 receives a shell control data stream 403 from the test bench controller 103.

Furthermore, test bench element connection shell 601 responds to transferred signal profiles or data streams independently of the test bench controller 103.

In order to avoid a description which overlaps with FIG. 5, more details will be given below on the specific properties of the test bench element connection shell 601 in FIG. 6.

The test bench element connection shell 601 is used in particular to form an interface connection 602 (shown by way of example in FIG. 6) between interface signals or buses and/or input/output signals or buses of the circuit unit 101 to be verified. Furthermore, different interface connections 602 may be present simultaneously and form any desired connection structures between the corresponding interfaces.

It is to be noted that all of the embodiments of a test bench element shell which are given above (for example a test bench element supervisory shell, a test bench element connection shell, etc.) as well as their modes of operation can be combined, interleaved, joined and/or integrated in any desired fashion. For example, a test bench element connection shell can thus both analyze the data streams and modify the connection structure as well as monitoring the communication of a test bench element. Any different combinations can be implemented and can be provided in accordance with the respective requirements.

Reference is made to the introduction to the description with respect to the conventional method illustrated in FIG. 4 for connecting test bench elements to a circuit unit to be verified.

Although the present invention has been described above by means of preferred exemplary embodiments, it is not restricted to them but rather can be modified in various ways.

LIST OF REFERENCES

In the figures, identical references designate identical or functional identical components.

| | |
|---|---|
| 101 | Circuit unit to be verified |
| 102a, . . . | Test bench elements (i = index) |
| 102i, . . . | |
| 102n | |
| 103 | Test bench controller |
| 104 | Controller |
| 111a, . . . | Control data stream (i = index) |
| 111i, . . . | |
| 111n | |
| 112 | Serial test data stream |
| 113 | Parallel test data stream |
| 114 | Controller data stream |
| 201 | Test bench element shell |
| 202 | Further interface data streams |
| 203a, . . . , 203g | Test data streams |
| 204a, 204b | Interface data streams |
| 204c | |
| 301 | First test bench element shell component |
| 302 | Second test bench element shell component |
| P0 (0), . . . , P0 (7), | Interface data streams |
| P0 (0), . . . , P0 (3) | |

-continued

| | | |
|---|---|---|
| P1 (0), . . . , | | |
| P1 (7) | | |
| 401 | First test bench element supervisory shell | 5 |
| 402 | Second test bench element supervisory shell | |
| 403 | Control data stream | |
| 601 | Test bench element connection shell | |
| 602 | Interface connection | 10 |

What is claimed is:

1. A method for simulating and testing a circuit unit to be verified, in which method interface data streams of the circuit unit to be verified are exchanged with test bench elements in a test/simulation device, having the steps:
 (a) connecting a circuit unit to be verified to at least one test bench element shell of a test/simulation device in order to transfer and switch interface data streams which are correspondingly output to associated test bench elements by the circuit unit to be verified;
 (b) connecting the at least one test bench element shell to the test bench elements in order to transfer test data streams which are output by the test elements to the circuit unit to be verified;
 (c) controlling the at least one test bench element shell by means of a shell control data stream which is provided by a test bench controller;
 (d) evaluating the interface data streams by a test bench element shell which is connected to the test bench elements, in order to check the correct operational capability of the circuit unit to be verified; and
 (e) configuring interfaces of a circuit unit to be verified by means of signal values at specific connection elements of the circuit unit to be verified and the corresponding shell, a predefinable signal value at a connection element of the circuit unit to be verified defining, during a reset phase, whether an interface is operated in an X mode or Y mode.

2. A method for simulating and testing a circuit unit to be verified, in which method interface data streams of the circuit unit to be verified are exchanged with test bench elements in a test/simulation device, having the steps:
 (a) connecting a circuit unit to be verified to at least one test bench element shell of a test/simulation device in order to transfer and switch interface data streams which are correspondingly output to associated test bench elements by the circuit unit to be verified;
 (b) connecting the at least one test bench element shell to the test bench elements in order to transfer test data streams which are output by the test elements to the circuit unit to be verified;
 (c) controlling the at least one test bench element shell by means of a shell control data stream which is provided by a test bench controller;
 (d) evaluating the interface data streams by a test bench element shell which is connected to the test bench elements, in order to check the correct operational capability of the circuit unit to be verified; and
 (e) providing a shell device with which individual bits are set, reset or read.

3. A method for simulating and testing a circuit unit to be verified, in which method interface data streams of the circuit unit to be verified are exchanged with test bench elements in a test/simulation device, having the steps:
 (a) connecting a circuit unit to be verified to at least one test bench element shell of a test/simulation device in order to transfer and switch interface data streams which are correspondingly output to associated test bench elements by the circuit unit to be verified;
 (b) connecting the at least one test bench element shell to the test bench elements in order to transfer test data streams which are output by the test elements to the circuit unit to be verified;
 (c) controlling the at least one test bench element shell by means of a shell control data stream which is provided by a test bench controller; and
 (d) evaluating the interface data streams by a test bench element shell which is connected to the test bench elements, in order to check the correct operational capability of the circuit unit to be verified, wherein the test bench element shell and/or the at least one test bench element shell component comprises a data multiplexer for demultiplexing multiplexed signals.

4. A method for simulating and testing a circuit unit to be verified, in which method interface data streams of the circuit unit to be verified are exchanged with test bench elements in a test/simulation device, having the steps:
 (a) connecting a circuit unit to be verified to at least one test bench element shell of a test/simulation device in order to transfer and switch interface data streams which are correspondingly output to associated test bench elements by the circuit unit to be verified;
 (b) connecting the at least one test bench element shell to the test bench elements in order to transfer test data streams which are output by the test elements to the circuit unit to be verified;
 (c) controlling the at least one test bench element shell by means of a shell control data stream which is provided by a test bench controller;
 (d) providing at least one test bench element shell in order to generate transaction-based vectors in a way which is compatible with fabrication tests; and
 (e) evaluating the interface data streams by a test bench element shell which is connected to the test bench elements, in order to check the correct operational capability of the circuit unit to be verified.

5. A method for simulating and testing a circuit unit to be verified, in which method interface data streams of the circuit unit to be verified are exchanged with test bench elements in a test/simulation device, having the steps:
 (a) connecting a circuit unit to be verified to at least one test bench element shell of a test/simulation device in order to transfer and switch interface data streams which are correspondingly output to associated test bench elements by the circuit unit to be verified;
 (b) connecting the at least one test bench element shell to the test bench elements in order to transfer test data streams which are output by the test elements to the circuit unit to be verified;
 (c) controlling the at least one test bench element shell by means of a shell control data stream which is provided by a test bench controller;
 (d) providing at least one test bench element shell, during which process test bench elements are either allowed to create or write and evaluate or analyze data streams, or are prevented from doing so; and
 (e) evaluating the interface data streams by a test bench element shell which is connected to the test bench elements, in order to check the correct operational capability of the circuit unit to be verified.

6. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;
(b) connecting the at least one test bench element shell to the test bench elements in order to transfer test data streams which are output by the test elements to the circuit unit to be verified;
(c) controlling the at least one test bench element shell by means of a shell control data stream which is provided by a test bench controller;
(d) evaluating the interface data streams by a test bench element shell which is connected to the test bench elements, in order to check the correct operational capability of the circuit unit to be verified; and
(e) providing a control operation of at least one test bench element supervisory shell in such a way that a simultaneous access by test data streams of different test bench elements to a single interface in each case is prevented.

7. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;
(b) connecting the at least one test bench element shell to the test bench elements in order to transfer test data streams which are output by the test elements to the circuit unit to be verified;
(c) controlling the at least one test bench element shell by means of a shell control data stream which is provided by a test bench controller;
(d) evaluating the interface data streams by a test bench element shell which is connected to the test bench elements, in order to check the correct operational capability of the circuit unit to be verified; and
(e) providing a control operation of at least one test bench element supervisory shell in such a way that a simultaneous transmission of instruction sequences of different test bench elements is prevented.

8. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;
(b) connecting the at least one test bench element shell to the test bench elements in order to transfer test data streams which are output by the test elements to the circuit unit to be verified;
(c) controlling the at least one test bench element shell by means of a shell control data stream which is provided by a test bench controller;
(d) evaluating the interface data streams by a test bench element shell which is connected to the test bench elements, in order to check the correct operational capability of the circuit unit to be verified; and
(e) providing a control operation of at least one test bench element supervisory shell in such a way that in each case a time window is assigned to the at least one test bench element.

9. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;
(b) connecting the at least one test bench element shell to the test bench elements in order to transfer test data streams which are output by the test elements to the circuit unit to be verified;
(c) controlling the at least one test bench element shell by means of a shell control data stream which is provided by a test bench controller;
(d) evaluating the interface data streams by a test bench element shell which is connected to the test bench elements, in order to check the correct operational capability of the circuit unit to be verified; and
(e) providing a control operation of at least one test bench element supervisory shell by analyzing or by detecting transmitted data streams in the test bench element supervisory shell itself.

10. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;
(b) connecting the at least one test bench element shell to the test bench elements in order to transfer test data streams which are output by the test elements to the circuit unit to be verified;
(c) controlling the at least one test bench element shell by means of a shell control data stream which is provided by a test bench controller;
(d) evaluating the interface data streams by a test bench element shell which is connected to the test bench elements, in order to check the correct operational capability of the circuit unit to be verified; and
(e) providing a control operation of at least one test bench element supervisory shell by means of a shell control data stream and/or by analyzing or by detecting transmitted data streams prevents specific predefinable instruction sequences and/or data sequences being transmitted by the least one test bench element to the circuit unit to be verified.

11. A method for simulating and testing a circuit unit to be verified, in which method interface data streams of the circuit unit to be verified are exchanged with test bench elements in a test/simulation device, having the steps:
(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a control operation of at least one test bench element supervisory shell by means of a shell control data stream and/or by analyzing or by detecting transmitted data streams is provided in such a way that exclusively predefinable instruction sequences and/or data sequences are transmitted by the at least one test bench element to the circuit unit to be verified.

12. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a monitoring operation of test data streams, transmitted via the at least one test bench element supervisory shell, by means of a shell control data stream and/or by analyzing or by detecting transmitted data streams in such a way that a warning message is issued when there is an unauthorized transmission by the at least one test bench element.

13. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a monitoring operation of test data streams, transmitted via the at least one test bench element supervisory shell, by means of a shell control data stream and/or by analyzing or by detecting transmitted data streams in such a way that a prioritization is carried out.

14. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a control operation and/or a monitoring operation of test data streams, transmitted via the at least one test bench element supervisory shell, by means of a shell control data stream and/or by analyzing or by detecting transmitted data streams for any desired predefinable number of test bench elements connected to the at least one test bench element supervisory shell.

15. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) providing at least one test bench element shell with which data streams can be both created or written and evaluated or analyzed (d) controlling the at least one test bench element shell by means of a shell control data stream which is provided by a test bench controller; and (e) evaluating the interface data streams by a test bench element shell which is connected to the test bench elements, in order to check the correct operational capability of the circuit unit to be verified.

16. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing at least one evaluation unit in at least one test bench element shell in a way which is interface-specific and can be re-used as desired, in order to analyze and evaluate data streams.

17. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a control operation of at least one test bench element supervisory shell in such a way that a simultaneous access by test data streams of a plurality of test bench elements to, in total, a single interface is prevented.

18. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a control operation of at least one test bench element supervisory shell in such a way that a simultaneous access by test data streams of any desired number of test bench elements to any desired number of interfaces is prevented.

19. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a test bench element connection shell which establishes predefinable connection structures as interface connections in order to form a means of connecting and/or diverting and/or assigning interface signals or buses as well as input/output signals or buses of the circuit unit to be verified.

20. A method for simulating and testing a circuit unit to be verified, in which method interface data streams of the circuit unit to be verified are exchanged with test bench elements in a test/simulation device, having the steps:

(a) connecting a circuit unit to be verified to at least one test bench element shell of a test/simulation device in order to transfer and switch interface data streams which are correspondingly output to associated test bench elements by the circuit unit to be verified;

(b) connecting the at least one test bench element shell to the test bench elements in order to transfer test data streams which are output by the test elements to the circuit unit to be verified;

(c) controlling the at least one test bench element shell by means of a shell control data stream which is provided by a test bench controller;

(d) evaluating the interface data streams by a test bench element shell which is connected to the test bench elements, in order to check the correct operational capability of the circuit unit to be verified; and (e) providing a test bench element connection shell which establishes predefinable connection structures as interface connections temporarily during a simulation or a test or permanently in order to form a flexible way a means for connecting and/or diverting and/or assigning interface signals or buses and input/output signals or buses of the circuit unit to be verified.

* * * * *